3,532,747
BROMINATED SALICYLANILIDE
Theodore E. Majewski, Midland, Mich., assignor to The Dow Chemical Company, Midland, Mich., a corporation of Delaware
No Drawing. Filed Dec. 9, 1965, Ser. No. 512,789
Int. Cl. C07c *103/20*
U.S. Cl. 260—559                 9 Claims

ABSTRACT OF THE DISCLOSURE

Salicylanilide is brominated in a reaction medium of one weight part of water to one to nine parts of one or more glycol ethers. Product 3,4',5-tribromosalicylanilide thereby obtained contains less than one percent of undesirable 4',5-dibromosalicylanilide.

---

This invention relates to a novel process for the bromination of salicylanilide. More particularly, this invention relates to the bromination of salicylanilide in a reaction medium of glycol ethers and water to produce a product mixture consisting predominantly of 3,4',5-tribromosalicylanilide, small amounts of 3,5-dibromosalicylanilide and containing less than one percent of 4',5-dibromosalicylanilide.

Whereas, it is generally believed that 4',5-dibromosalicylanilide has a low oral toxicity, it is believed to sensitize the skin to ultraviolet light. Thus, when brominated salicylanilides are to be applied to the skin, such as in bacteriostatic formulations, it is necessary that the 4',5-dibromosalicylanilide content thereof be held to a minimum, preferably not in excess of 1 percent by weight of the brominated salicylanilide product.

A number of methods have been proposed for the bromination of salicylanilide. Some common methods include the bromination of salicylanilide in water, alcohol, and acetic acid. None of these methods is satisfactory to produce a product mixture containing predominantly 3,4',5-tribromosalicylanilide, a small amount of 3,5-dibromosalicylanilide and less than 1 percent 4',5-dibromosalicylanilide. Whereas the present invention is directed to a method of producing brominated salicylanilide products consisting predominantly of 3,4',5-tribromosalicylanilide, a small amount of 3,5-dibromosalicylanilide and less than 1 percent 4',5-dibromosalicylanilide. The product thus produced is of great importance and utility in such environments as personal soaps. Other advantages of the present method will be apparent from the following description and examples.

In accordance with the present invention, salicylanilide is brominated in a reaction medium comprising predominantly a glycol ether-water mixture. The term glycol ether as employed in the present specification and claims refers to glycol monoethers corresponding to the formula lower alkyl—(O—$C_nH_{2n}$)$_x$—OH wherein $n$ represents one of the integers 2, 3 or 4, $x$ represents one of the integers 1, 2 or 3, and lower alkyl represents an alkyl group containing from 1 to 2 to 3 to 4 carbon atoms, inclusive. Representative glycol ethers to be employed in the present invention include ethylene glycol methyl ether, ethylene glycol ethyl ether, ethylene glycol n-butyl ether, diethylene glycol methyl ether, diethylene glycol n-butyl ether, propylene glycol methyl ether, dipropylene glycol methyl ether and tripropylene glycol methyl ether.

The bromination of salicylanilide in a reaction medium comprising an aqueous mixture of glycol ethers results in the formation of a desirable mixture of brominated salicylanilide products consisting predominantly of 3,4',5-tribrominated salicylanilide, small amounts of 3,5-dibromosalicylanilide and less than 1 percent of the undesirable 4',5-dibromosalicylanilide. The mixture thus formed is therefore very desirable for use in personal soaps because of the low content of 4',5-dibromosalicylanilide.

It is critical and essential to the present invention that the salicylanilide be brominated in a liquid reaction medium wherein at least 60 percent of the reaction mixture is a glycol ether-water mixture said glycol ether-water mixture containing 1 part by weight of water with from 1 to 9 parts by weight of 1 or more glycol ethers. In those cases where the glycol ether-water mixture comprises about 60 percent of the reaction medium, 1 part of water is employed with from 1 to 2 parts of glycol ether. In those cases wherein the reaction medium consists essentially of glycol ether and water, 1 part of water can be employed with from 1 to 9 parts of glycol ether and in a preferred embodiment 1 part by weight of water is employed with from about 2 to about 4 parts by weight of one or more glycol ethers. Within these extremes recited the amount of glycol ether to be employed in the glycol ether-water mixture is directly proportional to the percentage by weight of the glycol ether-water mixture in the total reaction medium. Thus when the glycol ether-water mixture comprises about 70 percent of the reaction medium, 1 part of water is employed with from 1 to about 3.5 parts of glycol ether. When glycol ether-water mixture comprises about 80 percent of the reaction medium 1 part of water is employed with from 1 to about 5 parts of glycol ether and when the glycol ether-water mixture comprises about 90 percent by weight of the reaction mixture 1 part by weight of the water is employed with from 1 to 7 parts by weight of glycol ether. Furthermore, it is critical and essential that the proportion of water to glycol ether to be employed do not differ too substantially from these amounts or materially reduced yields of 3,4',5-tribromosalicylanilide and increased yields of 4',5-dibromosalicylanilide will result.

The bromination is carried out and takes place readily at temperatures of at least 25° C. In a convenient procedure, the reaction is carried out at the boiling temperature of the reaction mixture and under reflux. However, in a preferred procedure, the reaction is carried out in the temperature range of from about 30° C. to about 100° C. Under such conditions, the reaction takes place readily with the production of the desired product comprising predominantly 3,4',5-tribromosalicylanilide, small amounts of 3,5-dibromosalicylanilide together with less than 1 percent of 4',5-dibromosalicylanilide.

The reactants are operably combined in a ratio of from 2.0 to 3.2 or 3.5 moles of bromine and preferable from 2.5 to 3.5 moles of bromine per mole salicylanilide.

The amount of the reaction medium to be employed is not critical. However, generally enough medium is employed to provide a pourable suspension or slurry of the final product. In a conventional procedure, the reaction medium is employed in an amount, by weight, equivalent to about five times the amount of salicylanilide starting material. Lesser amounts may be employed with somewhat longer reaction times. Excess amounts may be used without deleterious effects but such excesses are undesirable from the standpoint of economy. When low concentrations (10–20 percent by weight) of water are being employed, it is preferred to employ the reaction medium in an amount equivalent to at least five times the amount of salicylanilide.

In carrying out the process of the present invention, the salicylanilide is conveniently dispersed in the bromination medium. Thereafter, the bromine is usually added slowly portionwise to the dispersion of salicylanilide in the bromination medium. It has been found that the greater viscosity of the high molecular weight glycol ethers makes them more difficult to use than the lower molecular weight glycol ethers. During the addition of the bromine to the reaction mixture the temperature of the reaction mixture is maintained within the desired temperature range. In a convenient embodiment, the reaction mixture can be maintained at a temperature within the reaction temperature range for a short period of time following the addition of the bromine. Generally, the brominated salicylanilide product begins to precipitate in the reaction mixture as a crystalline solid during the addition of the bromine to the reaction mixture. The precipitated brominated salicylanilide product can be removed from the reaction mixture by such conventional procedures as filtration, decantation or centrifugation. In those cases where the brominated salicylanilide product does not precipitate in the reaction mixture, the reaction mixture can be concentrated by evaporation of low boiling components or cooled to facilitate the precipitation of the desired product.

The following examples are merely illustrative and are not intended to be limiting.

EXAMPLE 1

Bromine (191.8 grams; 1.2 moles) is added slowly portionwise to salicylanilide (85.4 grams; 0.4 mole) dispersed in 400 grams of bromination medium comprising 25 percent by weight water and 75 percent by weight of ethylene glycol ethyl ether. The temperature of the reaction medium is maintained at between 80° and 85° C. during the addition of the bromine and for one hour thereafter. During the addition of the bromine to the reaction mixture, the brominated salicylanilide product begins to precipitate in the reaction mixture as a crystalline solid. Following the heating period, the reaction is filtered to obtain the solid product. The brominated salicylanilide product obtained by filtration is then washed four times with 30 ml. portions of a mixture comprising 75 percent by weight of ethylene glycol ethyl ether and 25 percent by weight of water and finally with two 200-milliliter portions of water. The washed brominated salicylanilide product is then dried at 110°–120° C. and analyzed to determine the percentages of the various isomers. The results of the analysis are as follows: total yield 83.5 percent, 3,4',5-tribromosalicylanilide—94.0 percent, 3,5-dibromosalicylanilide—5.5 percent and 4',5-dibromosalicylanilide—0.29 percent.

EXAMPLE 2

Bromine (191.0 grams; 1.19 moles) is added slowly portionwise to salicylanilide (85.4 grams; 0.4 mole) dispersed in 400 grams of a bromination medium comprising 75 percent ethylene glycol methyl ether and 25 percent water. The temperature of the reaction mixture was maintained at between 40° and 45° C. during the addition of the bromine and for one hour thereafter. Following the reaction period, the brominated salicylanilide product is collected by filtration as described in Example 1. Thereafter, the solid product is washed four times with 50-milliliter portions of a 75 percent ethylene glycol methyl ether-25 percent water followed by four additional washes employing 100-milliliter portions of the same ethylene glycol methyl ether-water mixture. The washed product is dried at 110°–120° C. and upon analysis found to contain:

|  | Percent by weight of total product |
|---|---|
| 3,4',5-tribromosalicylanilide | 92.5 |
| 3,5-dibromosalicylanilide | 7.0 |
| 4',5-dibromosalicylanilide | 0.5 |

EXAMPLE 3

In similar operations, 0.4 mole of salicylanilide was brominated with from 1.2 to 1.4 moles of bromine, in various glycol ether-water mixtures. During the bromination, the temperature of the reaction mixture was maintained at between 80° and 110° C. Following the bromination, the reaction mixture was maintained at a temperature of 75°–110° C. for from 1 to 2 hours. Thereafter, the brominated salicylanilide product was separated from the reaction mixture as previously described.

The results from such operations are set forth in the following table which sets forth the glycol ether employed, the percentage of glycol ether by weight in the total reaction medium, the yield obtained as a percentage of the theoretical yield based upon salicylanilide employed, the percentages by weight of the various isomers obtained.

TABLE I

| Percentage of glycol ether by weight | Total grams of bromination medium | Percent of theoretical obtained | Percent by weight of brominated salicylanilide found in the bromination product | | |
|---|---|---|---|---|---|
| | | | 3,4'5-tribromo salicylanilide | 3,5-dibromo salicylanilide | 4',5-debromo salicylanilide |
| Ethylene glycol ethyl ether: | | | | | |
| 75 | 400 | 83 | 94 | 5.5 | 0.29 |
| 75 | 400 | 87.3 | 94 | 5 | 0.4 |
| 77 | 400 | 80.5 | 90.5 | 9 | 0.38 |
| 80 | 400 | 82.8 | 91 | 8.4 | 0.51 |
| 90 | 400 | 67.8 | 93 | 6.0 | 0.97 |
| Ethylene glycol methyl ether: | | | | | |
| 60 | 400 | 95.3 | 88 | 11 | 0.58 |
| 72 | 400 | 95.5 | 91 | 6 | 0.45 |
| 75 | 400 | 92.7 | 95 | 4.5 | 0.5 |
| Propylene glycol methy ether: | | | | | |
| 50 | 400 | 93 | 80 | 19 | 0.8 |
| 75 | 400 | 77.8 | 89 | 10 | 0.45 |
| Ethylene glycol n-butyl ether: 75 | 400 | 84.9 | 93.5 | 6.0 | 0.39 |
| Diethylene glycol ethyl ether: 75 | 400 | 84.2 | 95 | 4.5 | 0.5 |

I claim:
1. In a method of producing a bromination product comprising predominately 3,4',5 - tribromosalicylanilide which consists of reacting salicylanilide and bromine at between 25° C. and reflux in amounts equivalent to from 2½ to 3½ molecular proportions of bromine per molecular proportion of salicylanilide, the improvement which comprises the steps of carrying out the bromination in a reaction mixture comprising at least 60 percent by weight of the glycol ether-water mixture and thereafter separating as the bromination product a mixture containing predominately 3,4',5-tribromosalicylanilide and not greater than 1 percent by weight of 4',5-dibromosalicylanilide; said glycol ether-water mixture containing 1 part by weight of water with from 1 to 9 parts by weight of 1 or more glycol ethers corresponding to the formula lower alkyl—(O—$C_nH_{2n}$)$_x$—OH wherein $n$ represents one of the integers 2, 3 or 4, $x$ represents one of the integers 1, 2 and 3 and lower alkyl represents a member of the group consisting of alkyl groups having 1, 2, 3 and 4 carbon atoms, inclusive.

2. The method claimed in claim 1 wherein the bromination is carried out in a reaction medium consisting essentially of a glycol ether-water mixture containing 1 part by weight of water with from about 1 to 9 parts by weight of one or more glycol ethers.

3. The method claimed in claim 2 wherein the glycol ether-water mixture contains about 1 part by weight of water with from about 2 to about 4 parts by weight of one or more glycol ethers.

4. The method claimed in claim 1 wherein the glycol ether is ethylene glycol ethyl ether.

5. The method claimed in claim 1 wherein the glycol ether is ethylene glycol methyl ether.

6. The method claimed in claim 1 wherein the glycol ether is propylene glycol methyl ether.

7. The method claimed in claim 1 wherein the glycol ether is ethylene glycol n-butyl ether.

8. The method claimed in claim 1 wherein the glycol ether is diethylene glycol ethyl ether.

9. In a process for brominating salicylanilide which consists of reacting molecular bromine and salicylanilide, the improvement which consists of reacting bromine and salicylanilide in a molar ratio of from 2.5 to 3.5 moles of bromine per mole of salicylanilide in a medium which consists essentially of a mixture of water and glycol ether of the formula $R(OC_nH_{2n})_xOH$, said medium constituting at least 60 percent by weight of the reaction mixture and the molar ratio of water to glycol ether being 1:1–9, wherein R is alkyl of 1–4 carbon atoms, $n$ is 2, 3 or 4, and $x$ is 1, 2 or 3, and recovering the product formed therein.

References Cited
UNITED STATES PATENTS 3,064,048   11/1962   Schramm et al. _____ 260—559

JOHN D. RANDOLPH, Primary Examiner

H. I. MOATZ, Assistant Examiner

U.S. Cl. X.R.

260—999